Aug. 30, 1955     O. BRETSCHNEIDER     2,716,590
PRODUCTION OF HYDROCYANIC ACID
Filed June 17, 1952
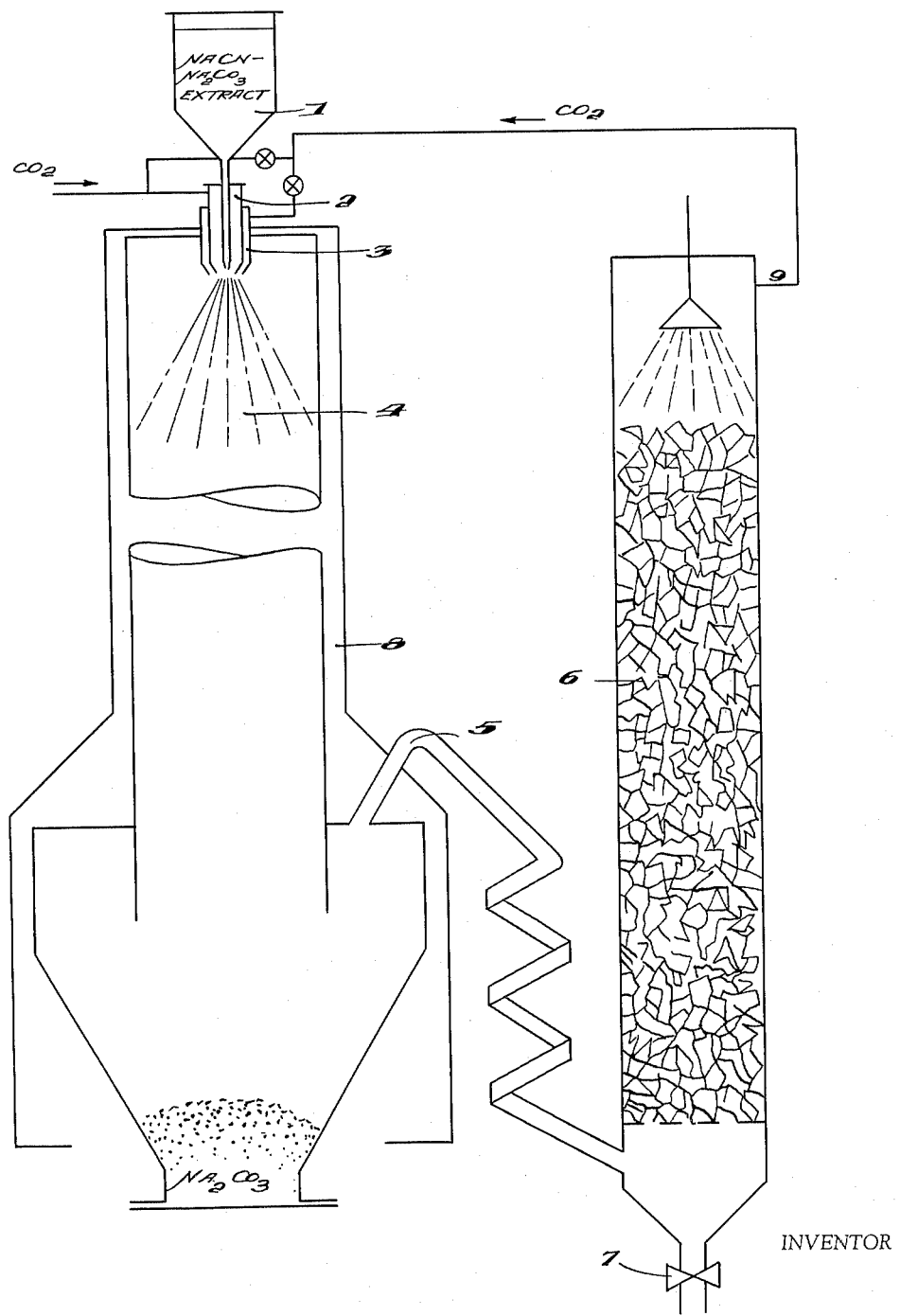
INVENTOR
OTTO BRETSCHNEIDER,
BY Bailey, Stephens & Huettig
ATTORNEYS

United States Patent Office 2,716,590
Patented Aug. 30, 1955

2,716,590

PRODUCTION OF HYDROCYANIC ACID

Otto Bretschneider, Frankfurt am Main, Germany, assignor to Deutsche Gold- und Silber-Scheideanstalt vormals Roessler, Frankfurt, Germany Application June 17, 1952, Serial No. 293,906

Claims priority, application Germany June 23, 1951

6 Claims. (Cl. 23—151)

The present invention relates to a process for the production of hydrocyanic acid and more particularly to the production of hydrocyanic acid from cyanide synthesis products containing alkali metal cyanide, alkali metal carbonate, carbon and finely divided iron.

Previously it was not considered practical to produce hydrocyanic acid directly from the cyanide synthesis process according to the so-called Bucher process wherein sodium cyanide containing products, which also contain varying quantities of soda, carbon and catalyst, are produced by furnacing an alkali, particularly soda, carbon, nitrogen and a catalyst such as iron. The customary practice was first to extract the synthesis products with volatile ammonia and then after evaporating off the extraction agent to obtain as pure a cyanide as possible. This method, however is not entirely satisfactory in view of the ammonia requirements and the relatively tedious evaporation required renders the procedure uneconomical to a certain degree and, consequently, does not offer any advantage for producing hydrocyanic acid from the pure cyanide thus produced.

It has also been attempted to produce hydrocyanic acid directly by continuously decomposing the crude product obtained in the cyaniding process. It was found, however, that the yield of hydrocyanic acid fluctuated to a great degree depending upon the composition of the synthesis product and, with maximum yields of only 75%, was substantially below expectations.

It is an object of the invention to provide a simple and commercially feasible process for the continuous production of hydrocyanic acid in good yields from the crude cyanide synthesis products which in addition to sodium cyanide, contain sodium carbonate, carbon and the iron employed as the catalyst in the cyanide synthesis.

In accordance with the invention, it has been discovered that hydrocyanic acid could not be produced effectively from the crude synthesis products of the Bucher process by carrying out such process as a closed cyclic process for the direct production of hydrocyanic acid from an alkali metal carbonate, carbon, nitrogen and water, as certain constituents of the crude synthesis products cause decomposition of the hydrocyanic acid formed upon treatment of such crude products with water and $CO_2$. In accordance with the invention, it was found that by dissolving the sodium cyanide and the soda from the crude synthesis product which contained in addition, varying amounts of carbon and finely divided iron employed as the catalyst in the cyanide synthesis, the leached out cyanide and soda were freed of the constituents which prevent the production of hydrocyanic acid in good yields. Preferably the crude synthesis product is leached with water at room temperature to separate the cyanide and soda from the crude product in a continuous manner. The extraction expediently is carried out in such a manner that a saturated cyanide solution of about 20% concentration is obtained. The extracted cyanide and soda, preferably in atomized form are then treated with $CO_2$ in the presence of steam whereby the cyanide is converted to hydrocyanic acid and soda without any substantial decomposition of the hydrocyanic acid formed. It was found that about 2 cubic meters of carbon dioxide are required to convert the sodium cyanide contained in one liter of a 20% solution. Hydrocyanic acid yields of at least 95% are obtained according to the invention. The soda formed in the reaction together with the soda extracted from the crude synthesis product is, according to the invention, recycled to the cyaniding step so that all of the alkali carbonate can be maintained in a closed cycle in the process.

In accordance with a preferred modification of the process according to the invention, the cyanide in the aqueous extract is converted to hydrocyanic acid at 150 to 300° C. by atomizing the extract in the presence of $CO_2$. Preferably the extract is atomized in the upper end of a reaction tower maintained at a temperature of 150–300° C. by an atomizer nozzle with the aid of $CO_2$ under pressure of, for example, 0.25 to 0.5 atmosphere gauge pressure. Other methods of atomization can also be employed, for example, nozzles which atomize liquids under their own hydrostatic pressure or rotary atomizers such as rotating discs and the like can be employed. Preferably carbon dioxide is introduced into the reaction tower at or near the zone of atomization. Upon atomization, the water contained in the extract is immediately transformed into steam and it, together with the carbon dioxide, converts the sodium cyanide into hydrocyanic acid and sodium carbonate. The sodium carbonate formed together with that contained in the extract separates out as a fine dry powder and can be collected at the bottom of the reaction tower and be recycled to the cyaniding step. It is, however, also possible to provide a moving surface heated to the temperature of the reaction in the path of the atomized extract which intercepts the major portion of the atomized droplets whereby the solid products accumulate on such surface and can continuously be removed therefrom by suitable scrapers or other means of removal.

It is also within the purview of the invention to concentrate the extract or evaporate it to dryness before the decomposition with $CO_2$ and steam. This modification of the invention has been found suited for extracts which still contain some free alkali in addition to the cyanide. The evaporation is preferably carried out at low temperatures so that the temperature of the solution does not exceed 50° C.

The gases obtained during the production of hydrocyanic acid essentially contain water, hydrocyanic acid and carbon dioxide. This gas mixture is first cooled to condense the steam and the condensed steam dissolves a substantial portion of the hydrocyanic acid. The remaining portion of the hydrocyanic acid in the gas mixture is scrubbed out with cold water. The remaining excess of $CO_2$ is then recycled to the reaction tower to convert further quantities of the extracted cyanide.

A suitable apparatus for carrying out the process of the invention is shown diagrammatically in the accompanying drawing.

Referring to the drawing, the cyanide extract is supplied from vessel 1 to the upper end of the reaction tower 4 through the atomizer nozzle 2. A spaced jacket 3 is provided around the atomizer nozzle 2 into which recycled carbon dioxide is introduced to prevent the formation of encrustations and clogging of the atomizer nozzle opening. The reaction tower 4 which can conveniently be constructed of sheet iron is provided with a heating jacket 8 to maintain the desired temperature therein. The solid soda which is formed in the reaction tower is collected in the bottom thereof and the hydrocyanic acid vapors formed together with the excess water vapor and carbon dioxide are passed from the reaction tower through a cooling coil 5, to the bottom of an absorption column 6 wherein the vapors are scrubbed with water. The main quantity of the hydrocyanic acid dissolves in the water which condenses during passage of the vapors through coil 5 and the remainder is separated from the carbon dioxide in the absorption column. The resulting aqueous hydrocyanic acid is withdrawn from the column at 7. The remaining carbon dioxide leaves the head of the column through conduit 9 and is recycled to the reaction tower 4 through nozzle 2 and jacket 3.

The following examples will serve to illustrate the manner in which the process according to the invention can be carried out.

Example 1

A mixture of sodium carbonate, charcoal and iron were heated in the usual manner in the presence of nitrogen at temperatures over about 800° C. for the continuous production of a reaction product containing sodium cyanide admixed with excess sodium carbonate, charcoal and iron. The product produced was leached with water at room temperature to provide an extract containing at least about 200 grams of NaCN per liter. This extract was continuously atomized in an apparatus such as shown in the drawing with the aid of 1½ cubic meters of carbon dioxide at a gauge pressure of ½ atmosphere per liter of extract. The reaction tower was maintained at a temperature between 250 and 300° C. by external heating. In addition to the carbon dioxide employed to atomize the extract, about 2.5 cubic meters of recycled carbon dioxide are introduced into the reaction tower through the jacket surrounding the atomizer nozzle to prevent clogging of such nozzle. The resulting reaction gas mixture containing hydrocyanic acid, water vapor and carbon dioxide was continuously withdrawn from the reaction tower and cooled to condense the water vapor. The condensed water vapor dissolved the major portion of the hydrocyanic acid in the reaction gas mixture. The remaining hydrocyanic acid was scrubbed out of the carbon dioxide by passing the gas mixture countercurrently through an absorbing column supplied with a water spray. The remaining carbon dioxide was recycled to the reaction tower and the resulting aqueous hydrocyanic acid was withdrawn from the base of the absorbing column. The soda formed in the reaction tower through the action of the water vapor and carbon dioxide upon the sodium cyanide, as well as the soda already contained in the extract collected as a dry white powder with a maximum cyanide content of 0.1 to 0.2% in the bottom of the reaction tower and was continuously withdrawn with the aid of a screw conveyor and was recycled to the cyanide synthesis step.

Example 2

An extract containing 200 grams of sodium cyanide in the same manner as in Example 1 was atomized in the top of a reaction tower heated internally to 250°–300° C. with gas flames. The burners were arranged in the reaction tower so that the flames burned in a tangential direction. The resulting combustion gases formed within the reaction tower provided the carbon dioxide required to convert the sodium cyanide contained in the atomized extract which was introduced in the central portion of the top of the reaction tower. The heating gas employed was the exhaust gas, containing about 30% CO and 70% $N_2$, resulting from the cyaniding step and was burned with approximately the theoretical quantity of air. The major quantity of the soda settled as a fine white powder in the bottom of the reaction tower and the portion carried off in the reaction gas mixture was separated therefrom in a cyclone. The hydrocyanic acid in the reaction gas mixture was separated therefrom by cooling and scrubbing as in Example 1. The remaining gas mixture which is primarily nitrogen containing a small quantity of carbon dioxide, was freed from carbon dioxide and recycled to the cyaniding step.

In the process according to the invention, the residues remaining after extraction of the cyanided product, which contain the excess carbon, the iron catalyst and sodium carbonate residues, can, after simple drying, be recycled to the cyaniding step. It is, therefore, possible, according to the invention, to carry out the entire process of cyaniding, extraction and conversion to hydrocyanic acid materially as a closed cycle into which only air, carbon and water must be introduced in order to produce pure hydrocyanic acid with a high yield. The process according to the invention renders it possible to provide a simple, economical and completely continuous process for the production of hydrocyanic acid in a cyclic process, in which the yields of hydrocyanic acid obtained are entirely independent of the composition of the crude synthesized cyanide product both as to material and quantities thereof. The cyaniding step can be carried out continuously in the usual manner in rotary or shaft furnaces.

I claim:

1. In a process for the continuous production of hydrocyanic acid by heating an alkali metal carbonate, carbon and nitrogen in the presence of finely divided iron as a catalyst to produce a crude cyanided product which besides alkali metal cyanide contains, alkali metal carbonate, carbon and finely divided iron and recovering hydrocyanic acid from such product, the steps which comprise extracting the crude cyanided product with water to form an aqueous extract containing alkali metal cyanide and alkali metal carbonate, atomizing the extract and introducing the atomized extract into a zone maintained at a temperature between 150° and 300° C. in the presence of carbon dioxide to form gaseous hydrocyanic acid and solid alkali metal carbonate, collecting the solid alkali metal carbonate formed in said zone and recycling it to the step in the process wherein the crude cyanided product is produced.

2. A process according to claim 1, comprising in addition the steps of drying the solid extraction residue remaining after extraction of the crude cyanided product and recycling it to the step in the process wherein the crude cyanided product is produced.

3. In a process for the continuous production of hydrocyanic acid by heating an alkali metal carbonate, carbon and nitrogen in the presence of finely divided iron as a catalyst to produce a crude cyanided product which besides alkali metal cyanide, contains alkali metal carbonate, carbon and finely divided iron and recovering hydrocyanic acid from such product, the steps which comprise extracting the crude cyanided product with water to form an aqueous extract containing alkali metal cyanide and alkali metal carbonate, atomizing the extract with the aid of carbon dioxide under pressure and introducing the atomized extract into a zone maintained at a temperature between 150° and 300 C. to form gaseous hydrocyanic acid and solid alkali metal carbonate, collecting the solid alkali metal carbonate formed in said zone and recycling it to the step in the process wherein the crude cyanided product is produced.

4. In a process for the continuous production of hydrocyanic acid by heating an alkali metal carbonate, carbon and nitrogen in the presence of finely divided iron and recovering hydrocyanic acid from such product, the steps which comprise extracting the crude cyanided product with water to form an aqueous extract containing alkali metal cyanide and alkali metal carbonate, atomizing the extract and introducing the atomized extract into a zone maintained at a temperature between 150° and 300° C. in the presence of carbon dioxide to form a gaseous mixture containing hydrocyanic acid, water vapor and carbon dioxide and solid alkali metal carbonate, collecting the solid alkali metal carbonate formed in said zone, recycling it to the step in the process wherein the crude cyanided product is produced, withdrawing the hydrocyanic acid containing gaseous mixture from said zone, cooling said gaseous mixture to condense the water vapor contained therein and scrubbing the remaining gaseous mixture with water to remove hydrocyanic acid therefrom.

5. In a process for the continuous production of hydrocyanic acid by heating an alkali metal carbonate, carbon and nitrogen in the presence of finely divided iron and recovering hydrocyanic acid from such product, the steps which comprise extracting the crude cyanided product with water to form an aqueous extract containing alkali metal cyanide and alkali metal carbonate, atomizing the extract and introducing the atomized extract into a zone maintained at a temperature between 150° and 300° C. in the presence of carbon dioxide to form a gaseous mixture containing hydrocyanic acid, water vapor and carbon dioxide and solid alkali metal carbonate, collecting the solid alkali metal carbonate formed in said zone, recycling it to the step in the process wherein the crude cyanided product is produced, withdrawing the hydrocyanic acid containing gaseous mixture from said zone, cooling said gaseous mixture to condense the water vapor contained therein, scrubbing the remaining gaseous mixture with water to remove hydrocyanic acid therefrom and recycling the resulting carbon dioxide to the zone into which the atomized extract is introduced.

6. In a process for the continuous production of hydrocyanic acid by heating an alkali metal carbonate, carbon and nitrogen in the presence of finely divided iron as a catalyst to produce a crude cyanided product which besides alkali metal cyanide contains alkali metal carbonate, carbon and finely divided iron and recovering hydrocyanic acid from such product, the steps which comprise extracting the crude cyanided product with water to form an aqueous extract containing alkali metal cyanide and alkali metal carbonate, atomizing the extract and introducing the atomized extract into a zone directly heated to 150° C. to 300° C. by combustion gases containing $CO_2$ to form gaseous hydrocyanic acid and solid alkali metal carbonate, collecting the solid alkali metal carbonate formed in said zone and recycling it to the step in the process wherein the crude cyanided product is produced.

References Cited in the file of this patent

UNITED STATES PATENTS

| Number | Name | Date |
|---|---|---|
| 576,264 | Gilmour | Feb. 2, 1897 |
| 1,037,061 | Schweitzer | Aug. 27, 1912 |
| 1,473,826 | Metzger | Nov. 13, 1923 |
| 1,519,434 | Banks | Dec. 16, 1924 |
| 1,761,433 | Dolley | June 3, 1930 |